G. W. MIXTER.

SHAFT MOUNTING FOR EARTHWORKING IMPLEMENTS.

APPLICATION FILED FEB. 26, 1909.

Reissued Nov. 3, 1914.

13,823.

2 SHEETS—SHEET 1.

Witnesses

B. Gram

S. Jay Teller

Inventor

George W. Mixter

By H. H. Bliss

Attorney

G. W. MIXTER.

SHAFT MOUNTING FOR EARTHWORKING IMPLEMENTS.

APPLICATION FILED FEB. 26, 1909.

Reissued Nov. 3, 1914. 13,823.

2 SHEETS—SHEET 2.

Inventor

George W. Mixter

Witnesses

B. G. Bram

S. Jay Teller

By H. H. Bliss

Attorney

THE NORRIS PETERS CO., PHOTO-LITHO., WASHINGTON, D. C.

UNITED STATES PATENT OFFICE.

GEORGE W. MIXTER, OF MOLINE, ILLINOIS, ASSIGNOR TO DEERE & COMPANY, OF MOLINE, ILLINOIS, A CORPORATION OF ILLINOIS.

SHAFT-MOUNTING FOR EARTHWORKING IMPLEMENTS.

Specification of Reissued Letters Patent. Reissued Nov. 3, 1914.

13,823.

Original No. 826,795, dated July 24, 1906, Serial No. 312,731. Application for reissue filed February 26, 1909. Serial No. 480,288.

*To all whom it may concern:*

Be it known that I, GEORGE W. MIXTER, a citizen of the United States, residing at Moline, in the county of Rock Island and State of Illinois, have invented certain new and useful Improvements in Shaft-Mountings for Earthworking Implements; and I do hereby declare the following to be a full, clear, and exact description of the invention, such as will enable others skilled in the art to which it appertains to make and use the same.

This invention relates to improvements in the devices for mounting and supporting shafts in earth-working implements which have their bearings normally situated close to the soil surface where they are liable to come in contact with masses of wearing or abrading material, such as sand, dust and grit of various forms, and which carry earth-working tools so arranged that when in operation they cause a powerful end thrust upon the shaft and its bearing.

In the accompanying drawings, which form a part of this specification, the invention is shown embodied in a cultivator-gang comprising three disks mounted on a shaft, which is carried by a yoke straddling the middle disk, said yoke being adapted for attachment to a cultivator-rig carried by the implement; but it will be understood that the invention may be embodied in other forms or arrangements.

The construction of the cultivator-rig and frame of the implement does not enter into the present invention, and therefore these parts are not illustrated.

Figure 1:
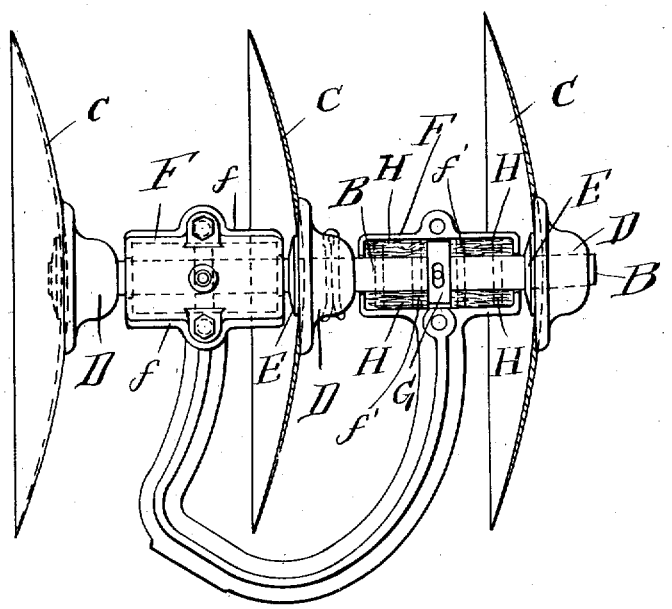
Figure 2:
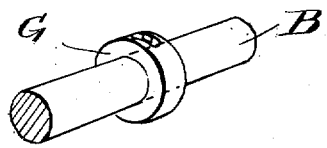
Figure 3:
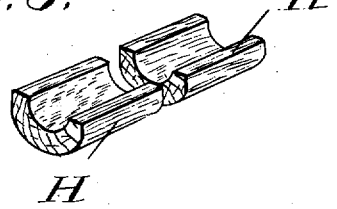
Figure 4:
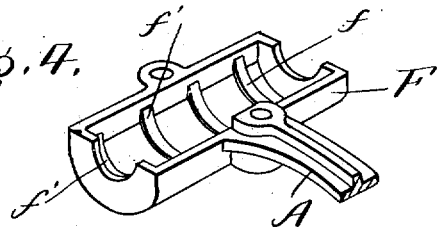
Figure 5:
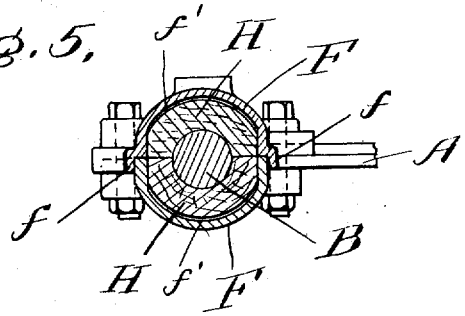

Figure 1 of the drawings is an elevation of said cultivator-gang embodying my invention, parts thereof being represented in section. Fig. 2 is a perspective view of a fragment of the disk-shaft showing a collar thereon which takes the end thrust. Fig. 3 shows two of the semi-circular wooden bushings employed in the disk-bearings. Fig. 4 is a perspective view of one of the lower half-boxes. Fig. 5 is a central vertical section through one of the bearings.

Referring in detail to the drawings, the yoke A carries the shaft or spindle B, on which the cultivator disks C are affixed. These disks may be rigidly mounted on the shaft by any suitable means, as by seating the disks in the hub D and clamping them thereto by the nuts or rivets E, the hubs D being pinned or othewise rigidly secured on the shaft. Each shaft-bearing comprises a chambered box, which, as shown, is composed of two half-boxes, the lower one of which is preferably integral with its yoke-arm, while the upper half-box or cap is held down on the lower one by suitable bolts in the usual way. The upper half-box is also shown having a bottom flange *f* overlying the top of the lower half-box, as shown more clearly in Fig. 5, to protect the bearings from dirt or soil which may fall from the disks. It is observed that one bearing is arranged between each pair of disks. Between the hubs D and the adjacent ends of the bearings F there is sufficient space to permit dirt to fall loosely between these parts and under ordinary circumstances not to be clogged or wedged into this space. The same is true of the space between the nuts E and the opposite ends of the bearings F, this space being wider on the outside than next the shaft to prevent dirt clogging. At the center of each bearing and pinned or otherwise rigidly secured on the shaft is a collar G, and at both sides of said collar bushings H are fitted on the shaft within the bearing boxes, which boxes are of sufficient size to hold said bushings. The collars G in conjunction with bushings H take the end thrust in both directions, which acts on the shaft by reason of the resistance of the earth to the disks in their travel. The half-boxes are shown having internal segmental ribs *f'*, which are slightly raised from the inner walls of the half-boxes, and the bushings H are seated on said ribs. There are four of the bushings H for each bearing, two half-bushings for the lower half-box and two for the upper half-box, arranged at opposite sides of the collar G.

As shown in Fig. 5, the half-boxes in which the bushings are fitted are interiorly shaped so as to prevent the bushings from turning, the opposite sides of the bushings being shown with flat faces abutting against the flat interior sides of the bearing boxes. These bushings H, which may of course be replaced when worn, take the end thrust and wear from the collars G and also receive the wear of the shaft in its rotation, thereby providing bearings which are perfectly adapted to implements of this character, protecting the metal parts and avoiding the usual abrading due to entrance of dirt or grit, the bearing being, moreover, protected from the entrance of dirt, as before explained.

The bearing bushings H are made of wood, preferably of maple, because of the well known fact that it is porous and can have formed thereon a surface which, while supporting, will not wear the surface of a metallic shaft. And, as further well known in the art, a porous bushing, such as one of wood, can be impregnated with oil for lubricating.

When the ribs at *f'* are brought, with the box halves toward the bushing sections, the bolts bring them into contact with the latter, as shown in the drawings.

I am aware that rotary shafts in shop machinery and similar places have been mounted in hollow box-like bearing structures, the latter having metallic bushings and large fluid-oil chambers, and the shafts, respectively, having metallic collars each positioned between two of the metallic bushings, and arranged to contact during rotation with the oil in the said chambers and to elevate and distribute it. But a shaft-support of that character is entirely prohibited from use in farm implements such as the present one, where the shaft is supported at points near the soil surface and is constantly in contact with masses of dust, sand and abrading materials which must be prevented from lodging between two closely adjacent, relatively movable, metallic surfaces, as the wear, resulting either from the necessary rotation or from the powerful end thrust on the shaft, rapidly destroys such metallic parts. The shaft, here, is supported upon sections of wooden or equivalent bushing which, first, permit prolonged rotation of the shaft without wearing its surface, second, because of their porosity, can be impregnated with a supply of oil that lasts indefinitely, and, third, can be drawn together by the clamping elements of the box so as to be held close to the shaft and contact with it around its entire surface, and at the same time so that the bushing sections are effectually prevented from rotating with the shaft. No oil-carrying chamber, carrying a fluid-oil mass in contact with the rotary parts is practicable, in such implements, as the oil body would immediately become charged with sand and abraiding material, and the latter would be assisted in finding access to, and being distributed upon, the wearing parts. Here the bushing extends practically entirely across and fills the chamber of the box, leaving no appreciable space for the accumulation of wearing material. I am also aware that in implements of the class referred to some of the facts specified have been recognized, and that oil impregnated wooden blocks have been used. But in the devices of that class known to me the practice has been to provide two metallic flanges or collars inside of and closely adjacent to the metallic end walls of the box, and to have the bearing parts so arranged that the compression on the wooden bushings was exerted axially by two narrow metal spurs respectively carried by the box halves and engaging with a limited portion only of the end surface of each wooden bushing. After the outer ends of the bushing sections, in one of the said earlier forms of box mounting, have become worn even to a small extent, an endwise movement of the rotary part becomes possible, and then the rotary and the stationary metallic flanges or collars are brought close together, and wear of the metal surfaces immediately commences. In my construction this is impossible under any ordinary circumstances as the rotary thrust device is in the center, axially, between two long bushing sections, either one of which must be completely worn or ground away before a rotary surface can reach a position where it will be possible for it to grind or wear upon abrading particles. There is no force exerted by any of parts carried by the box halves except such force as is exerted on radial lines.

The metallic box halves and the bushing halves are both separable at the same horizontal plane. There is no projection on the inner surface of either box half of such nature as to require a depression or aperture in, or require any division, axially, between the bushing sections, and, therefore, there is no necessity for registering such a projection on the one with any aperture or division space in the other when the box halves are brought together by the bolts.

The bushing sections are described above as made of wood, this being to contradistinguish them from metallic bushings, but intended to include those which have, for the present purposes, the qualities incident to wood as distinguished from metal.

The thrust collar G is of a diameter as large as possible in order to give it ample bearing surface, but its diameter is less than that of the wooden bushing, the difference depending upon the extent to which the bushing material is compressed under the working pressure and strains of the shaft; but it is never so great as to permit the collar to wear upon or contact with the metallic surfaces of the box.

Having thus fully described my invention, what I claim as new, and desire to secure by Letters Patent of the United States, is—

1. In an earth-working implement having a rotary shaft supported normally close to the soil surface and provided with rotary earth-working tools exerting endwise thrust thereon, the combination of a hollow metallic bearing box situated as aforesaid relative to the surface, a set of detachable wooden bushing sections at each end of said box, a shaft in said box supported vertically on the said bushings, a thrust collar on said shaft of less diameter than that of the bushings and disposed between the inner ends of the bushing sections of the two sets, and a series of rotary earth-engaging tools rigidly secured to said shaft, all of said parts being constructed and arranged substantially as set forth, whereby contact of the shaft collar with the metal of the box is avoided until one of said bushing sections has been removed.

2. In an earth-working implement having a rotary shaft supported normally close to the soil surface and provided with rotary earth-working tools exerting endwise thrust thereon, the combination of a hollow metallic bearing box situated as aforesaid relatively to the soil surface and having non-rotary end walls, a shaft extending through the said box and having a rotary thrust collar in the central transverse planes of the box, two elongated stationary wooden bushings, one on each side of said rotary collar, and each bearing against one of the said non-rotary end walls, the bushings the shaft and the collar substantially entirely filling the chamber in the box, and the bushings holding the shaft and the collar out of contact with the box until one of the bushings has been removed.

In testimony whereof I affix my signature in presence of two subscribing witnesses.

GEORGE W. MIXTER.

Witnesses:
EUGENE L. TAYLOR,
ROY E. ANDERSON.

Copies of this patent may be obtained for five cents each, by addressing the "Commissioner of Patents, Washington, D. C."